(12) United States Patent
Rovner

(10) Patent No.: US 9,182,258 B2
(45) Date of Patent: Nov. 10, 2015

(54) VARIABLE FREQUENCY MAGNETIC FLOWMETER

(75) Inventor: Bruce David Rovner, Minneapolis, MN (US)

(73) Assignee: Rosemount Inc., Bloomington, MN (US)

( * ) Notice: Subject to any disclaimer, the term of this patent is extended or adjusted under 35 U.S.C. 154(b) by 295 days.

(21) Appl. No.: 13/135,182

(22) Filed: Jun. 28, 2011

(65) Prior Publication Data
US 2013/0006544 A1     Jan. 3, 2013

(51) Int. Cl.
*G01F 1/58*   (2006.01)
*G01F 1/60*   (2006.01)

(52) U.S. Cl.
CPC ... *G01F 1/58* (2013.01); *G01F 1/60* (2013.01)

(58) Field of Classification Search
CPC .............. G01F 1/60; G01F 1/58; G01F 1/00; G01F 1/56
USPC ................ 702/45; 73/861.11, 861.12, 861.17
See application file for complete search history.

(56) References Cited

U.S. PATENT DOCUMENTS

| | | | |
|---|---|---|---|
| 3,274,831 A | 9/1966 | Cushing | |
| 4,137,766 A | 2/1979 | Handel | |
| 4,156,363 A | 5/1979 | Suzuki et al. | |
| 4,227,408 A | 10/1980 | Schmoock et al. | |
| 4,303,980 A | 12/1981 | Yard | |
| 4,704,907 A | 11/1987 | Mannherz et al. | |
| 4,807,630 A * | 2/1989 | Malinouskas | 600/323 |
| 5,325,728 A | 7/1994 | Zimmerman et al. | |
| 5,443,552 A * | 8/1995 | Tomita | 73/861.17 |
| 5,564,420 A * | 10/1996 | Nazarian et al. | 600/407 |
| 6,237,424 B1 | 5/2001 | Salmasi et al. | |
| 6,453,272 B1 | 9/2002 | Slechta | |
| 6,615,149 B1 * | 9/2003 | Wehrs | 702/76 |
| 6,626,048 B1 | 9/2003 | Dam Es et al. | |
| 6,973,839 B2 | 12/2005 | Wray | |
| 7,353,119 B2 | 4/2008 | Foss et al. | |
| 7,637,169 B2 * | 12/2009 | Shanahan et al. | 73/861.08 |
| 7,688,057 B2 | 3/2010 | Foss et al. | |

FOREIGN PATENT DOCUMENTS

| | | |
|---|---|---|
| JP | 04104014 | 6/1992 |
| JP | 7012607 A | 1/1995 |
| JP | 2003315121 A | 11/2003 |
| KR | 930007114 B1 | 7/1993 |
| KR | 100729643 B1 | 6/2007 |
| KR | 100748613 B1 | 8/2007 |

OTHER PUBLICATIONS

M. Komarek, "Frequency selection of sine wave for dynamic ADC test", Meas. Sci. Rev. vol. 10, No. 6, 2010.*
International Search Report and Written Opinion, Patent Cooperation Treaty Office, dated Nov. 28, 2012.
Extended European Search Report, dated Feb. 26, 2015, for European Application No. 128041811, 6 pages.

* cited by examiner

*Primary Examiner* — Mohamed Charioui
*Assistant Examiner* — Ruihua Zhang
(74) *Attorney, Agent, or Firm* — Kinney & Lange, P.A.

(57) ABSTRACT

An apparatus comprises a pipe section for process flow, a coil for generating a magnetic field across the pipe section, a current source for energizing the coil to generate the magnetic field, and an electrode for sensing an electromotive force induced across the process flow by the magnetic field. The current source energizes the coil at a plurality of different pulse frequencies. A processor calculates a function of the electromotive force at the plurality of different pulse frequencies, and generates a flow output based on the function.

12 Claims, 4 Drawing Sheets

VARIABLE FREQUENCY MAGNETIC FLOWMETER

BACKGROUND

This invention relates generally to fluid processing, and specifically to process flow measurement and control. In particular, the invention concerns measurement techniques for magnetic flowmeters.

Magnetic flowmeters (or mag meters) measure flow by Faraday induction, an electromagnetic effect. The meter energizes a coil to generate a magnetic field across a pipe section, and the magnetic field induces an electromotive force (EMF) across the process flow. The resulting potential difference (or voltage) is measured using a pair of electrodes that extend through the pipe section and into the process flow, or via capacitive coupling. The flow velocity is proportional to the induced EMF, and the volumetric flow rate is proportional to the flow velocity and flow area.

In general, electromagnetic flow measurement techniques are applicable to water-based fluids, ionic solutions and other conducting flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters provide fast, accurate flow measurements in applications where differential pressure-based techniques are disfavored because of the associated pressure drop (for example, across an orifice plate or Venturi tube). Mag meters can also be used when it is difficult or impractical to introduce a mechanical element into the process flow, such as turbine rotor, vortex-shedding element or Pitot tube.

Across these applications, there is an ongoing need for improved magnetic flow measurement techniques. In particular, there is a need for reduced-bias flow measurements in high-precision applications subject to process noise effects, including electronic, mechanical and electromagnetic noise contributions.

SUMMARY

This invention concerns an apparatus for measuring flow, and a method for using the apparatus. The apparatus includes a pipe section for process flow, a coil for generating a magnetic field across the pipe section, a current source for energizing the coil, and an electrode for sensing the electromotive force induced across the process flow by the magnetic field.

The current source energizes the coil at a plurality of different pulse frequencies. A processor calculates a function of the electromotive force at the plurality of different pulse frequencies, and generates a flow output based on the function.

DETAILED DESCRIPTION

Figure 1:
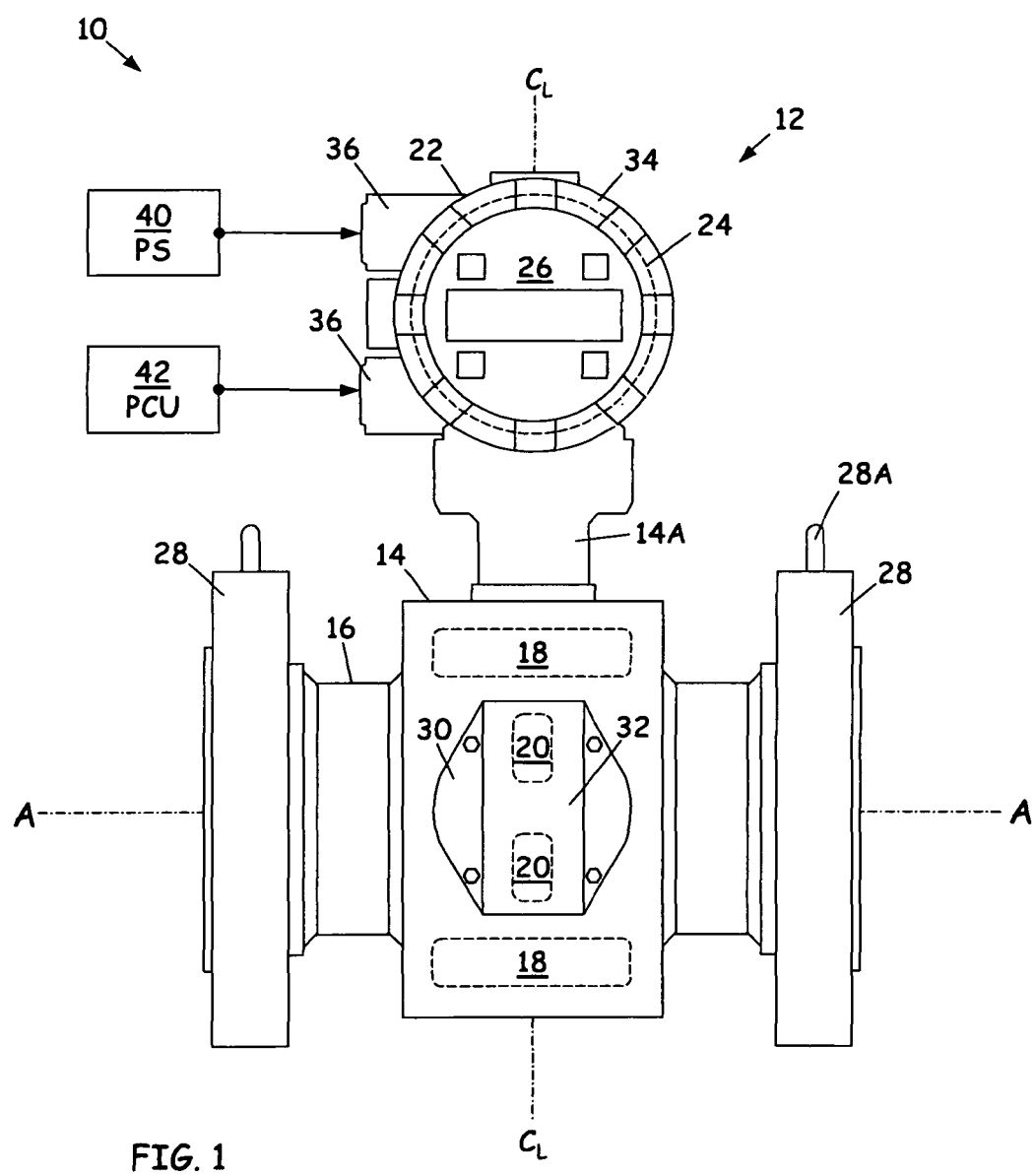
FIG. 1 is a schematic side view of a magnetic flowmeter, in a flanged embodiment with integral mount transmitter.

FIG. 1 is a schematic side view of one embodiment of magnetic flowmeter 10, in a flanged configuration with integral mount transmitter 12. Flowmeter 10 comprises sensor housing 14 and pipe section 16, with coils 18 and electrodes 20 (shown in dashed lines) located in sensor housing 14. Transmitter 12 comprises transmitter housing 22 with electronics board (or controller) 24 (also shown in dashed lines), and local operator interface (LOI) 26. Controller 24 generates a variable-frequency pulsed energizing current for coils 18, improving performance and reducing signal bias in environments subject to process noise, as described below.

Figure 2:
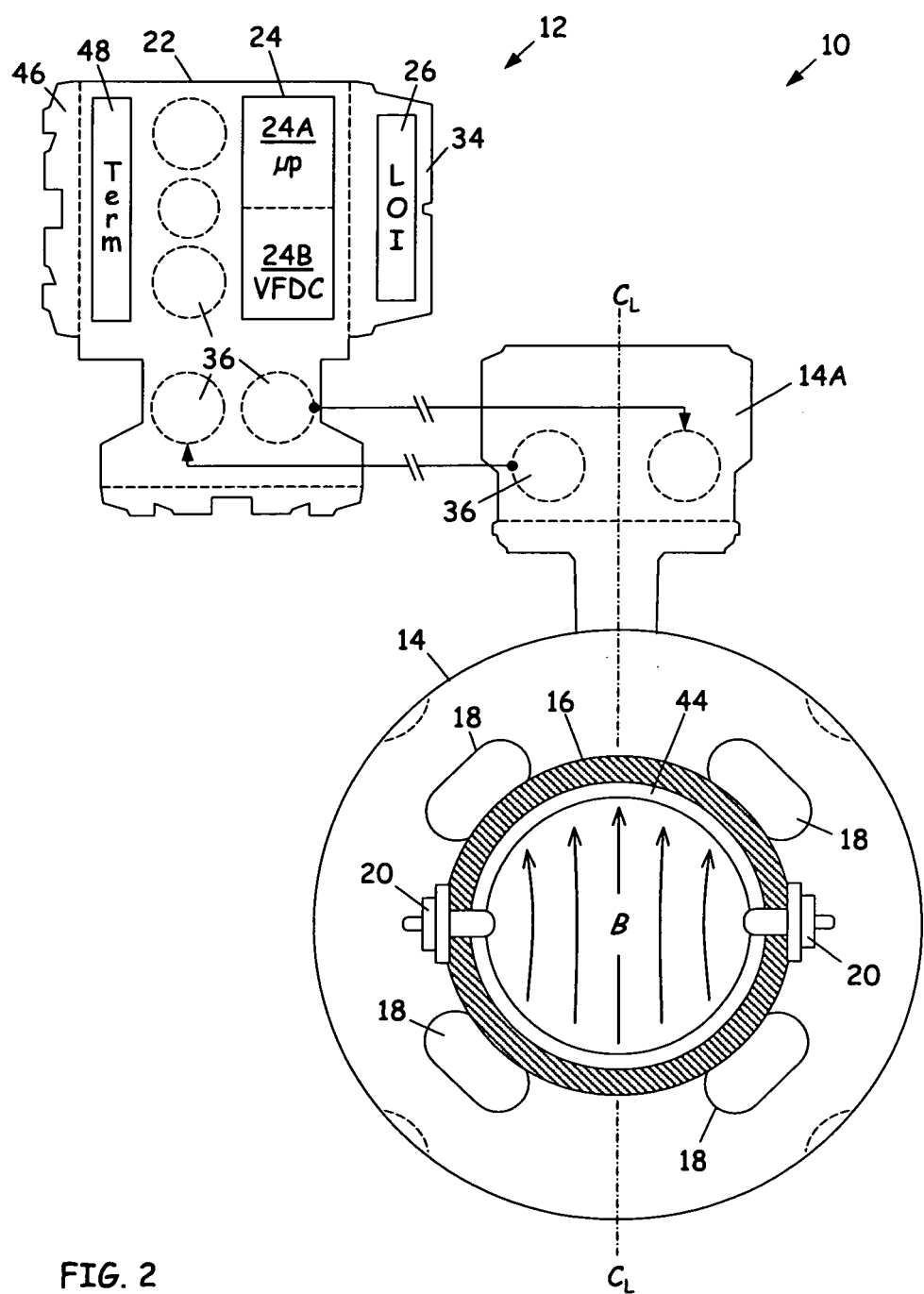
FIG. 2 is a schematic end view of a magnetic flowmeter, in a wafer-type embodiment with remote mount transmitter.

In the integral mount embodiment of FIG. 1, transmitter 12 is mounted directly onto interface portion 14A of sensor housing 14, with direct internal connections between controller 24, coils 18 and electrodes 20. Alternatively, transmitter 12 is remote mounted and the connections are external, as shown in FIG. 2.

Sensor housing 14 is formed of a strong, durable magnetic metal such as carbon steel, in order to shield coils 18 and electrodes 20 from external fields and disturbances that could affect flow measurements. Sensor housing 14 also protects from dirt, oil and water contamination, inhibits the entry of explosive and corrosive agents, and prevents physical contact with other hazards in the industrial processing environment.

Pipe section 16 comprises a variable length of pipe or process flow conduit, with inner diameter (ID) ranging from one half inch (12.7 mm) or less up to twelve inches (30 cm) or more. Pipe section 16 is typically formed of a nonmagnetic metal such as stainless steel, in order to pass the magnetic flux lines generated by coils 18 across the process flow.

In the flanged embodiment of FIG. 1, pipe section 16 includes through-hole flanges 28 for mounting magnetic flowmeter 10 in a pipe run or other flow structure, with lugs 28A to support flowmeter 10 during transport and installation. Depending on embodiment, flanges 28 may be formed of a stainless steel material, for example as used for pipe section 16, or a carbon steel material, as used for sensor housing 14. Alternatively, any of sensor housing 14, pipe section 16 and flanges 28 may be formed of carbon steel, stainless steel, aluminum, copper, brass or another metal or metal alloy, or of a durable polymer or thermoplastic material such as PVC (polyvinyl chloride) or ABS (acrylonitrile butadiene styrene).

Coils 18 and electrodes 20 are located inside sensor housing 14. Coils 18 comprise wound copper wires or other conducting windings, which are oriented about the outer diameter (OD) of pipe section 16 to generate a magnetic field across the process flow. In some embodiments, coils 18 incorporate magnetically soft core and flux return components to increase field strength and uniformity, or to shape the field lines and reduce fringing outside sensor housing 14.

Electrodes 20 extend through pipe section 16 to sense the potential difference (or EMF) induced across the process flow, either by direct electrical contact or capacitive coupling. Depending on embodiment, electrode cover 30 may be provided for access to electrodes 20, with nameplate 32 to identify the flowmeter by manufacturer, model or serial number. As shown in FIG. 1, electrodes 20 may also be "clocked" or rotated about axis A, so that the electrode plane is oriented at a skew angle of up to 45 degrees with respect to centerline $C_L$.

Transmitter housing 22 comprises front cover 34 for electronics board 24 and local operator interface 26, and conduit connections 36 for connecting transmitter 12 to power supply (PS) 40 and process control unit (PCU) 42. Power supply 40 comprises an AC (line) or DC power supply, or both. Process control unit 42 comprises a remote communicator, remote operator or process control system, which utilizes output from magnetic flowmeter 10 to monitor or control process variables including, but not limited to, the flow rate through pipe section 16.

In two-wire embodiments, transmitter 12 accommodates a range of different communication protocols, including, but not limited to, standard analog (4-20 mA) signals, hybrid analog-digital protocols such as HART®, and digital measurement and control architectures including Foundation™ Fieldbus, PROFeBUS/PROFI® NET and Plantweb®. Alternatively, transmitter 12 utilizes a combination of loop wires, cables, control buses and data lines, or a wireless interface for radio-frequency (RF), infrared (IR) or optical communications. In these and other embodiments, suitable transmitters 12 and magnetic flowmeters 10 are available from Rosemount Inc. of Eden Prairie, Minn., an Emerson Process Management company, with improvements as described herein.

FIG. 2 is a schematic end view of magnetic flowmeter 10, in a wafer-type (flangeless) configuration with remote mount transmitter 12. Depending on embodiment, magnetic flowmeter 10 also utilizes additional mounting structures, including, but not limited to, alignment rings, threaded compression fittings, and external collar-type coupling elements.

In confined installations, where there is insufficient room near pipe section 16, the remote mount configuration of FIG. 2 allows transmitter 12 to be located on a nearby process structure such as a beam, wall or partition, or on another flow pipe or conduit. Alternatively, transmitter 12 may be located up to 1,000 feet (about 240 m) or more from sensor housing 14, for example to accommodate more centralized or accessible transmitter placement, or to locate transmitter 12 in a control room, outside the process environment.

To encompass each of these embodiments, the term "flowmeter," as used herein, may include not only pipe section 16, sensor housing 14 and the internal components thereof, but also transmitter 12 and its components. In particular, "flowmeter" may encompass both integral and remote mount embodiments of transmitter 12, regardless of the connection length between transmitter 12 and sensor housing 14, and regardless of the particular form in which the connections are made.

In the end view of FIG. 2, pipe section 16 (shown with cross hatching) extends axially through sensor housing 14, and sensor housing 14 forms an annular enclosure about pipe section 16, coils 18 and electrodes 20. Magnetic field B is oriented transversely across pipe section 16, substantially perpendicular to the process flow.

Lining 44 is formed of a nonmagnetic insulating material, which lines the inside diameter of pipe section 16 to form an electrical, chemical, and mechanical barrier between pipe section 16 and the process flow. In particular, lining 44 insulates pipe section 16 from the process fluid, and protects against erosion and corrosion due to chemical and abrasive agents in the process flow. In some embodiments, lining 44 is comprised of a PFA (Perfluoroalkoxy) material such as Teflon®, Teflon®-PFA or Tefzel®-PFA, a PPS (Polyphenylene sulfide) material such as Ryton® PPS, or another polymer such as Neoprene, polyurethane or natural rubber, as available from commercial vendors including Rosemount Inc.

Coils 18 are oriented about the outer diameter of pipe section 16, and configured to generate magnetic field B across the process flow. Electrodes 20 extend from the OD of pipe section 16 through lining 44 on the ID of pipe section 16, making electrical contact with the process flow in order to sense the EMF induced by magnetic field B. Alternatively, electrodes 20 form a capacitive coupling with the process flow, as described above. In addition, the plane of electrodes 20 can either be perpendicular to centerline $C_L$, as shown in FIG. 2, or electrodes 20 can be clocked at a skew angle of up to 45°, as shown in FIG. 1.

Transmitter 12 comprises transmitter housing 22 with front (electronics) cover 34 for electronics board 24 and local user interface 26, and rear (terminal) cover 46 for one or more terminal blocks 48. Transmitter housing 22 also provides additional conduit connections 36 for connecting transmitter 12 to interface portion 14A of sensor housing 14.

Electronics board (or controller) 24 comprises a processor or microprocessor (µp) 24A, and variable frequency current supply (VFDC) 24B. Processor 24A comprises an interface for connecting to the process control system or remote operator, and for communicating an output representing the flow rate through pipe section 16.

Local operator interface 26 comprises an interactive visual display for local control and communications with transmitter 12. In some embodiments, local operator interface 26 includes menu-based navigational keys to enter installation data and configuration parameters, run test modes, and access other transmitter functions.

Figure 3:
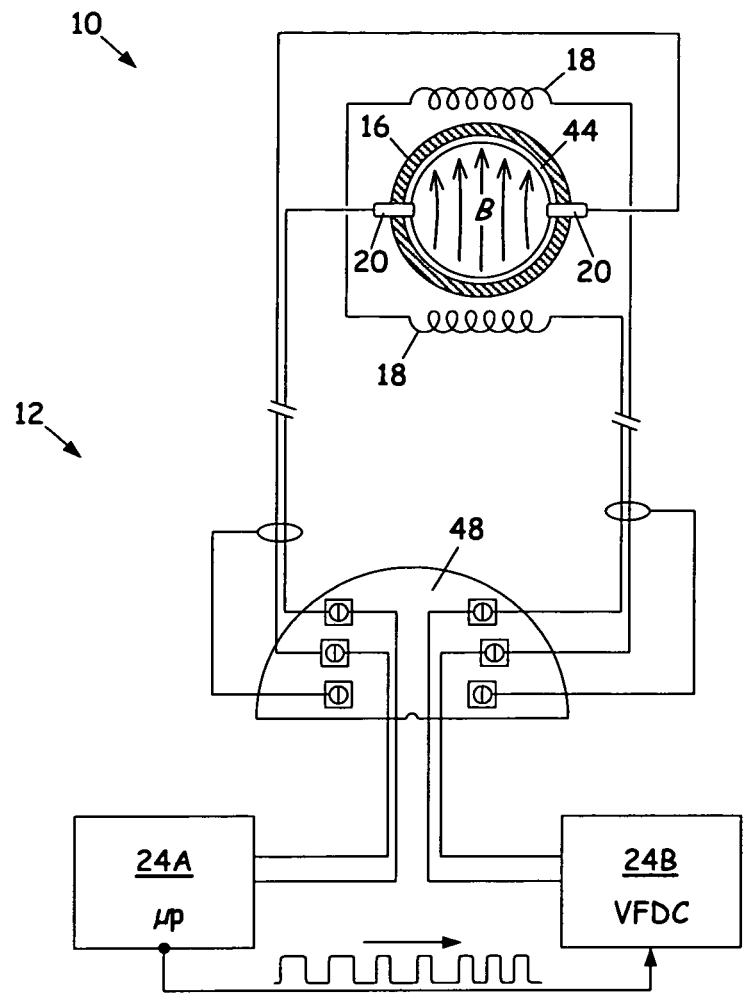
FIG. 3 is a wiring diagram for a magnetic flowmeter with a variable frequency pulsed current source.

Terminal block 48 is formed of a durable plastic or other insulating material, with electrical connections for power and input/output (I/O) communications with the process control system, as shown in FIG. 1. Depending on embodiment, one or more terminal blocks 48 may also be provided for making connections to coil 18 and electrodes 20 in sensor housing 14, as shown in FIG. 3.

The individual components of controller 24, local operator interface 26 and terminal block 28 may be provided in the form of distinct electronics boards or circuit elements, as shown in FIG. 2, or in an integrated electronics assembly or stack. In addition, controller 24 may also be configured to switch between internal and external power sources for variable frequency current supply 24B. In some of these embodiments, magnetic flowmeter 10 utilizes an external power supply 40, as shown in FIG. 1, which provides an AC or DC current that is switched, pulsed or modulated by variable frequency current supply 24B.

In each of these embodiments, variable frequency current supply 24B provides a pulsed energizing current to coils 18, and the current is pulsed at a plurality of different frequencies. Electrodes 20 sense the EMF induced across the process flow, and processor 24A calculates the flow output based on a function of the EMF at the plurality of different pulse frequencies. In general, the function comprises a mean, a weighted average or another averaging function of the EMF signals, as induced at each of the different pulse frequencies, in order to reduce signal bias due to noise effects as described below.

More specifically, coils 18 are configured to generate a substantially uniform magnetic field B inside pipe section 16. The flux lines are oriented across pipe section 16 and lining 44, as shown in FIG. 2, intersecting the process flow in a substantially perpendicular or normal sense (i.e., at approximately 90°). Over a relatively wide operating range, the field strength (or magnetic flux density) is approximately proportional to the energizing current, which switches the field on and off when coils 18 are pulsed by variable frequency current source 24B.

When a conducting process fluid flows through magnetic field B, a Faraday loop forms across electrodes 20. Electrodes 20 sense the induced EMF (or Faraday voltage) across pipe section 16, where the induced EMF is substantially proportional to the flow velocity and magnetic field strength.

In mathematical form, induced potential E is proportional to average flow velocity V, average magnetic field strength B, and inner diameter D of the flow channel defined by lining 44:

$$E = kVBD \quad [1]$$

The "k-factor" (k) is a proportionality constant that depends upon the units in which E, V, B and D are measured.

Inverting Eq. 1, flow velocity V is given as a function of induced potential E, magnetic field strength B, and flow channel diameter D:

$$V = \frac{E}{kBD}. \quad [2]$$

The volume flow rate, in turn, is the average flow velocity times the flow area.

FIG. 3 is a schematic wiring diagram for magnetic flowmeter 10. In this embodiment, electrodes 20 extend through pipe section 16 and lining 44 to sense the EMF induced by process fluid flow across magnetic field B, as described above. Terminal block 48 connects processor 24A to electrodes 20 and current source 24B to coils 18.

To improve accuracy, magnetic flowmeter 10 is configured for pulsed DC (direct-current) operation. In this mode, processor 24A compares the induced EMF signal from electrodes 20 at maximum (peak) and minimum (near zero) magnetic field, in order to correct for offset and zero drift. Pulsed-DC measurements also reduce the effects of electrolytic reactions between the process fluid and electrodes 20, capacitive couplings to coils 18, impedance-based phase shift, and quadrature contributions including inductive coupling between the magnetic field and the process fluid or electrode signal lines.

Variable frequency current source 24B also varies the pulse current frequency to reduce process noise effects. In some embodiments, processor 24A clocks current source 24B to modulate the pulse frequency or duty cycle, as shown in FIG. 3. Alternatively, current source 24B comprises internal pulse modulation circuit components, or a gate or clock for clocking an external current source, as described above.

Figure 4:
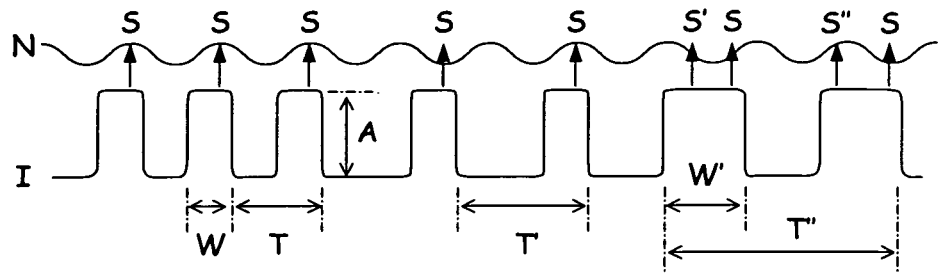
FIG. 4 is a plot of a variable frequency pulsed current signal.

FIG. 4 is a plot of a variable frequency pulsed current signal I, with contemporaneous process noise signal N. Each current pulse is defined by pulse amplitude A, pulse width W (or W') and pulse period T (or T', T"). Pulse period T defines the pulse frequency (f=1/T), and the duty cycle is given by pulse width W over pulse period T (that is, duty cycle=W/T or, equivalently, duty cycle=Wf).

Current pulse amplitude A depends on coil resistance and input voltage, which typically varies from 10-40V or more. In some embodiments, current pulse I is strictly a DC (direct current) signal, and the coil current and magnetic field have a substantially constant (pulsed) polarity. In other embodiments, an AC (alternating current) source is used, or the electronics introduces a shift or offset to produce a pulsed AC signal in coils 18. In these embodiments, both the coil current and magnetic field may periodically reverse direction.

Noise signal N results from a number of different contributions. These include electronic ripple and bleed-through from line power and other AC signals, and pressure or flow pulsations from pumps, compressors, turbines and other rotary equipment. Noise signals N also result from mechanical vibrations in pipe sections and other process structures, either independently or in combination with other sources.

In the particular embodiment of FIG. 4, the first set of current pulses have approximately constant pulse width W and period T, with frequency f corresponding to the dominant noise signal. The induced EMF is measured at sampling phase S, which is defined on a pulse-by-pulse basis as a fraction of pulse period T. In general, sampling phase S is selected near the end of each current pulse, after the magnetic field has settled at a substantially maximum value.

When noise signal N matches the sampling frequency, the flow measurement is subject to bias because each sample "reads" the same phase of the noise signal, resulting in constant shift toward higher or lower values. The effect is similar when the noise and sampling frequencies are in harmonic relationship, particularly for the first, third and other odd-order harmonics, which dominate the Fourier transform of substantially square-wave pulsed current signals I. Bias effects can also occur at non-harmonic sampling and noise frequencies, however, due to beat generation and other interference effects.

Regardless of the particular form of noise signal N, therefore, constant-frequency sampling may in general introduce bias into the flow measurement. In particular, bias may be introduced when pumps and other turbine machinery are cycled on and off, or when a particular noise frequency shifts across the sampling frequency (or a harmonic thereof). High-power mechanical equipment can also generate noise even without a direct flow coupling, for example by inducing mechanical vibrations in flow pipes and other process structures, or by bleed-through on the line power.

To reduce these effects, the pulse frequency of the coil current is varied, as shown in FIG. 4. In particular, pulse width W and pulse period T are independently variable, in order to increase or decrease the pulse frequency at either fixed width or fixed duty cycle, or to vary both pulse width and duty cycle as a function of frequency. As a result, sampling phase S is shifted with respect to noise signal N, reducing bias by sampling the noise at a range of different phases and corresponding amplitudes.

In the particular example of FIG. 4, the coil inductance is relatively low and the current pulses have a long "flat" or plateau region across most of pulse width W. In this case, it is also possible to adjust sampling phase S, independently of pulse period T. In other configurations, particularly for larger pipe diameters, the settling time may be longer and the plateau region may be relatively narrower, requiring an increase in pulse width W.

Figure 5:
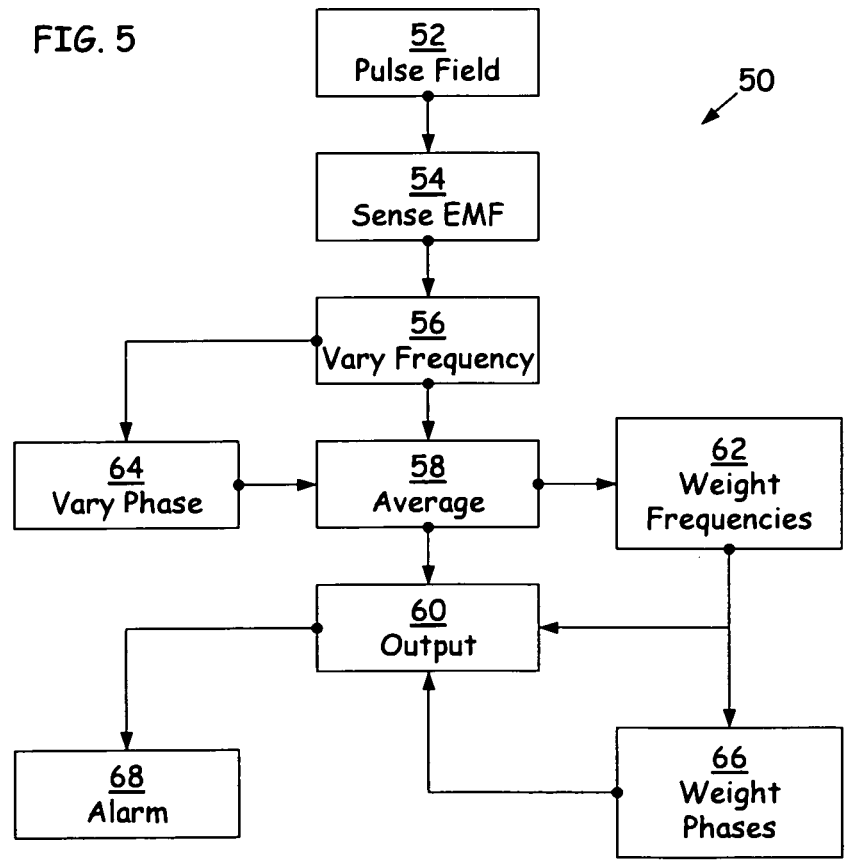
FIG. 5 is a flow chart illustrating a method for measuring flow with a variable frequency magnetic flowmeter.

FIG. 5 is a flow chart illustrating method 50 for measuring flow with a variable frequency magnetic flowmeter. Method 50 comprises generating a pulsed magnetic field across a process flow (step 52), sensing an electromotive force induced by the magnetic field (step 54), varying a frequency of the pulsed magnetic field (step 56), calculating an average function of the EMF at a plurality of different frequencies (step 58), and outputting a flow measurement, based on the average (step 60).

In some embodiments, method 50 also comprises weighting the frequencies (step 62) to generate a weighted average, for example to exclude one or more frequencies that are subject to noise-induced bias. In other embodiments, method 50 comprises varying a sampling phase (step 64) and weighting the phases (step 66) to generate a weighted average. In further embodiments, method 50 comprises generating an alarm (step 68) based a deviation or difference of the EMF at a particular frequency or phase, as compared to the mean or average.

Generating a pulsed field (step 52) comprises energizing a coil or other field source to generate a pulsed magnetic field across a process flow. The field characteristics are determined by the current pulse amplitude, pulse width and pulse frequency, as described above for FIG. 4.

Sensing the electromotive force (step 54) comprises sensing a voltage or potential difference induced by the magnetic field, for example using a pair of electrodes positioned across a lined flow pipe (FIG. 2). The potential difference (that is, the induced EMF) varies with the magnetic field strength and the average flow velocity, typically with a generally linear form.

Varying a frequency of the pulsed magnetic field (step 56) comprises varying the frequency of the energizing current source to generate a plurality of different pulse frequencies. The magnetic field pulse shape and pulse frequency follow those of the current pulse, depending on additional parameters such as coil inductance and flowmeter geometry, as described above.

In some embodiments, the pulse frequency is varied by changing the pulse period, independently of the pulse width, and the duty cycle is increased or reduced accordingly. In other embodiments the pulse with is also varied, and the pulse frequency and duty cycle are independent.

In typical embodiments, at least three different pulse frequencies are generated. In general, the sampling frequencies are spaced so that the harmonics do not overlap, or so that one set of harmonics does not overlap with the others. This further reduces bias by avoiding repeated harmonic sampling of the noise signal.

Calculating an average (step 58) comprises defining an averaging function of the electromotive force at the plurality of different pulse frequencies. In some embodiments, the averaging function comprises a common (or un-weighted) mean of the electromotive force at each of the different frequencies, with each contribution given equal weight. In other embodiments, the averaging function comprises a weighted mean or weighted average based on different frequency and phase contributions, as described below. In further embodiments, the averaging function includes contributions from different sampling periods, for example a running average taken over two, three or more consecutive sampling periods, or a time-weighted average in which contributions are weighted based on the relative sampling time.

Generating an output (step 60) comprises generating an output signal representing the process flow rate, based on the averaging function. In particular, the output is based on a mean, average or weighted average of the electromotive force at a plurality of different pulse frequencies, rather than a single pulse frequency.

Weighting the frequencies (step 62) comprises comparing the induced EMF at each pulse frequency to the common mean, defining a difference between the common mean and the EMF for each pulse frequency, and weighting the average based on the difference. The difference is variously defined as an absolute or relative (percent) deviation from the mean, or by a statistical measure such as a z-score based on the standard deviation, or a probability or likelihood based on a deviation or z-score.

In one embodiment, the weighting is either zero or one. This is essentially a voting or veto technique, in which EMF values within a particular range of the mean are assigned a uniform relative weight of one, and those outside the range are assigned a weight of zero. The zero-weighted values are thus "vetoed" or excluded from the flow output, while the one-weighted values are included.

In some of these embodiments, particular frequencies are vetoed or excluded when the corresponding EMF differs from the mean by more than the rated accuracy of the flowmeter. For high-precision applications, the rated accuracy may 1% or less, for example about 0.2%. In other embodiments, particular frequencies are vetoed or excluded when the corresponding EMF differs by a selected number of standard deviations from the mean, for example one, two or three, or when a probability or likelihood of the EMF (e.g., based on a random sampling hypothesis) is less than a particular threshold, for example 1%, 5% or 10%.

In further embodiments, a statistical analysis is repeated on the reduced sample, in order to verify the remaining measurements and exclude any additional frequencies that differ substantially from the new average. Alternatively, a continuously weighted average is used, where the weights are defined by a likelihood or probability function, as described above, with relative weights between zero and one.

Method 50 may also comprise sensing the electromotive force at a plurality of different phases (step 64), as shown in FIG. 4. In these embodiments, calculating an average (step 58) comprises calculating an average of the EMF at a plurality of different pulse frequencies and a plurality of different phases.

Sensing the EMF at different phases further reduces bias because it generates a more complete sample of the process flow, including different phases and amplitudes of the noise component. In some embodiments, the flow output is based on a common (or un-weighted) mean of EMF, as sampled at each individual phase. In other embodiments, the output comprises a weighted mean (step 66) of the different phase contributions, where the weights are based on a difference or deviation from the average (or common mean), as described above for frequency weighting (step 62).

Depending on embodiment, therefore, the flow function may comprise an average of the EMF at plurality of different frequencies, or at a plurality of different frequencies and a plurality of different phases. The flow output, in turn, may comprise a common mean, an average, or a weighted average, based on the different frequency and phase contributions.

In each of these embodiments, the processor generates reduced-bias variable-frequency flow measurements without additional operator input or configuration requirements, and regardless of the nature or source of the noise signal itself. When a pump or other noise source is introduced into a process system, for example, the averaging function automatically reduces bias in the flowmeter output, whether the noise source is identified or not. Bias is further reduced by frequency and phase weighting, which automatically accommodate changes in the noise spectrum (e.g., when a pump or turbine speed changes), without the need for frequency matching, phase locking and other complex signal processing techniques.

In some embodiments, a warning output or alarm indicator is generated (step 68) when the deviation of any frequency or phase component exceeds a particular threshold, based on its difference from the common mean or average. In general, the alarm threshold may correspond to a veto threshold, as described above (e.g., a percentage or sigma deviation, or a likelihood), but the alarm signal is independent of frequency or phase weighting. Thus it is possible to generate an alarm indicator based on the deviation of a particular frequency or phase contribution from the mean, whether or not the deviation is used to weight the average that is used in the flow measurement output.

While the invention has been described with reference to exemplary embodiments, it will be understood by those skilled in the art that various changes may be made and equivalents may be substituted for elements thereof, without departing from the scope of the invention. In addition, modifications may be made to adapt particular situations or materials to the teachings of the invention, without departing from the essential scope thereof. Therefore, the invention is not limited to the particular embodiments disclosed herein, but includes all embodiments falling within the scope of the appended claims.

The invention claimed is:

1. An apparatus comprising:
   a pipe section for process flow;
   a coil for generating a magnetic field across the pipe section;
   a current source for energizing the coil to generate the magnetic field, wherein the current source energizes the coil at a plurality of different pulse frequencies, and the plurality of different pulse frequencies includes at least three pulse frequencies spaced so that their harmonics do not overlap so that repeated harmonic sampling of a noise signal is avoided and bias from the noise signal is reduced;
   an electrode for sensing an electromotive force induced across the process flow by the magnetic field;
   a processor for calculating a function of the electromotive force at the plurality of different pulse frequencies, and for generating a flow output based on the function; and
   wherein the function comprises a weighted average of the electromotive force at each of the different pulse frequencies, wherein the weighted average is weighted based on a difference between the electromotive force at each of the different pulse frequencies and a common mean, and wherein the weighted average excludes pulse frequencies based on the difference.

2. The apparatus of claim 1, wherein the flow output comprises an alarm indicator based on the difference.

3. The apparatus of claim 1, wherein the weighted average comprises weightings of zero and one based on a difference between a value of the electromotive force at a particular pulse frequency and the common mean, wherein a weighting of zero excludes the value of the electromotive force at the particular frequency from the flow output, and wherein a weighting of one includes the value of the electromotive force at the particular frequency in the flow output.

4. The apparatus of claim 1, wherein the electrode senses the electromotive force at a plurality of different phases, and the current source is configured to adjust a sampling phase independent of the pulse frequencies.

5. The apparatus of claim 4, wherein the function comprises an average of the electromotive force at the plurality of different phases.

6. A magnetic flowmeter comprising:
   a pipe section, the pipe section having an inner diameter and an outer diameter;
   a coil proximate the outer diameter of the pipe section;
   a pulsed current source connected to the coil, wherein the pulsed current source provides a plurality of different pulse frequencies, and the plurality of different pulse frequencies includes at least three pulse frequencies spaced so that their harmonics do not overlap so that repeated harmonic sampling of a noise signal is avoided and bias from the noise signal is reduced;
   electrodes extending from the outer diameter of the pipe section to the inner diameter of the pipe section, wherein the electrodes sense an electromotive force across the pipe section;
   a processor connected to the electrodes, wherein the processor generates a flow output as a function of the electromotive force at the plurality of different pulse frequencies; and
   wherein the function comprises a weighted average of the electromotive force at each of the different pulse frequencies, wherein the weighted average is weighted based on a difference between the electromotive force at each of the different pulse frequencies and a common mean, and wherein the weighted average excludes pulse frequencies based on the difference.

7. The flowmeter of claim 6, further comprising a lining on the inner diameter of the pipe section, wherein the electrodes extend through the lining to contact a process flow.

8. The flowmeter of claim 6, wherein the flow output comprises an alarm based on the difference.

9. The flowmeter of claim 6, wherein the function comprises an average of the electromotive force at a plurality of different phases, and the phases are independent of the pulse frequencies.

10. A method of measuring flow, the method comprising:
    generating a pulsed magnetic field across a process flow;
    sensing an electromotive force induced across the process flow by the pulsed magnetic field;
    varying a frequency of the pulsed magnetic field, wherein the pulsed magnetic field has a plurality of different pulse frequencies, and the plurality of different pulse frequencies includes at least three pulse frequencies spaced so that their harmonics do not overlap so that repeated harmonic sampling of a noise signal is avoided and bias from the noise signal is reduced;
    calculating a weighted average of the electromotive force at the plurality of different pulse frequencies, wherein the weighted average is weighted based on a difference between the electromotive force at each of the different pulse frequencies and a common mean;
    excluding pulse frequencies based on the difference; and
    generating a flow output based on the average.

11. The method of claim 10, further comprising generating an alarm based on the difference.

12. The method of claim 10, wherein sensing an electromotive force comprises sensing the electromotive force at a plurality of different phases, and the phases are independent of the pulse frequencies; and wherein calculating an average comprises calculating an average of the electromotive force at the plurality of different pulse frequencies and the plurality of different phases.

* * * * *